(12) United States Patent
Iwata et al.

(10) Patent No.: US 9,727,988 B2
(45) Date of Patent: Aug. 8, 2017

(54) LOGIC GRAPH DISPLAYING APPARATUS AND LOGIC GRAPH DISPLAY METHOD, BOTH FOR USE WITH MOLDING MACHINES

(71) Applicant: Toshiba Kikai Kabushiki Kaisha, Tokyo (JP)

(72) Inventors: Akio Iwata, Numazu (JP); Toshihito Okamoto, Gotemba (JP)

(73) Assignee: TOSHIBA KIKAI KABUSHIKI KAISHA, Tokyo (JP)

( * ) Notice: Subject to any disclaimer, the term of this patent is extended or adjusted under 35 U.S.C. 154(b) by 666 days.

(21) Appl. No.: 13/747,036

(22) Filed: Jan. 22, 2013

(65) Prior Publication Data
US 2013/0187925 A1    Jul. 25, 2013

(30) Foreign Application Priority Data

Jan. 23, 2012    (JP) .................................. 2012-011204

(51) Int. Cl.
G09G 5/22     (2006.01)
G06T 11/20    (2006.01)
B29C 45/76    (2006.01)

(52) U.S. Cl.
CPC ............ G06T 11/206 (2013.01); B29C 45/76 (2013.01); B29C 2045/7606 (2013.01)

(58) Field of Classification Search
CPC ................... G06T 11/206; B29C 45/76; B29C 2045/7606; G01R 31/3177
See application file for complete search history.

(56) References Cited

U.S. PATENT DOCUMENTS

| | | | |
|---|---|---|---|
| 5,469,352 A | 11/1995 | Yukutomo et al. | |
| 6,570,592 B1 * | 5/2003 | Sajdak | G01R 13/02 345/440.1 |
| 6,603,477 B1 * | 8/2003 | Tittle | 345/440 |
| 6,704,014 B2 | 3/2004 | Usui et al. | |
| 8,041,400 B2 * | 10/2011 | Kim | 455/566 |

(Continued)

FOREIGN PATENT DOCUMENTS

| | | |
|---|---|---|
| CN | 1413822 | 4/2003 |
| CN | 1853905 | 11/2006 |

(Continued)

OTHER PUBLICATIONS

English Language Abstract of JP 4-133712 published May 7, 1992.

(Continued)

*Primary Examiner* — Robert Craddock
(74) *Attorney, Agent, or Firm* — DLA Piper LLP US

(57) ABSTRACT

A logging data about a signal identifier of the I/O signals which changed in on/off state are stored in a ring buffer. A logging screen includes identifier display parts, logic-graph display parts and first and second cursors. The logic-graph display parts display logic graphs associated with signal identifiers, respectively. When any one of the identifier display parts displayed on the logging screen is clicked, the logging screen is changed to an input window. If a desired input identifier is input in the input window, the logging data associated with the signal identifier is read from the ring buffer and the logic graph is displayed in the logic-graph display parts. The logic graph can be modified.

20 Claims, 11 Drawing Sheets

(56) References Cited

U.S. PATENT DOCUMENTS

| | | | |
|---|---|---|---|
| 8,648,860 B2* | 2/2014 | Vrba et al. | 345/440 |
| 2002/0054041 A1 | 5/2002 | Usui et al. | |
| 2003/0174131 A1* | 9/2003 | Lanir | 345/419 |
| 2004/0186607 A1 | 9/2004 | Yoshinaga et al. | |
| 2004/0223002 A1* | 11/2004 | Fukaya et al. | 345/619 |
| 2004/0227738 A1* | 11/2004 | Sudoh | 345/173 |
| 2006/0259824 A1* | 11/2006 | Sohm et al. | 714/38 |
| 2008/0184114 A1 | 7/2008 | Hano | |
| 2009/0012656 A1* | 1/2009 | Uchiyama et al. | 700/306 |
| 2010/0235771 A1* | 9/2010 | Gregg, III | 715/769 |
| 2010/0306315 A1* | 12/2010 | Smith et al. | 709/203 |

FOREIGN PATENT DOCUMENTS

| | | |
|---|---|---|
| CN | 101337420 | 1/2009 |
| JP | H03-167607 | 7/1991 |
| JP | 4-133712 | 5/1992 |
| JP | 5-42575 | 2/1993 |
| JP | H06-210692 | 8/1994 |
| JP | 2000-126988 | 11/1995 |
| JP | 9-174636 | 7/1997 |
| JP | 2001-334560 | 12/2001 |
| JP | 2004-199670 | 7/2004 |
| JP | 2004-249718 | 9/2004 |
| JP | 2008-149569 | 7/2008 |
| JP | 2009-012318 | 1/2009 |
| WO | WO 2007/034926 | 7/2007 |

OTHER PUBLICATIONS

English Language Abstract of JP 5-42575 published Feb. 23, 1993.
English Language Translation of JP 5-42575 published Feb. 23, 1993.
English Language Abstract of JP 9-174636 published Jul. 8, 1997.
English Language Translation of JP 9-174636 published Jul. 8, 1997.
English Language Abstract of 2004-199670 published Jul. 15, 2004.
English Language Translation of 2004-199670 published Jul. 15, 2004.
Chinese Office Action issued in CN 201310023608.1 dated Feb. 15, 2015 with Translation.
English Language Abstract for JP H03-167607 published Jul. 19, 1991.
English Language Abstract and Translation for JP 2000-126988 published May 9, 2000.
English Language Abstract for CN 1413822 published Apr. 30, 2003.
English Language Abstract for CN 1853905 published Nov. 1, 2006.
English Language Abstract for CN 101337420 published Jan. 7, 2009.
Japanese Office Action issued in JP 2012-011204 mailed Jun. 30, 2015 with English Language Translation.
English Language Abstract and Translation for JP 2004-249718 published Sep. 9, 2004.
English Language Abstract and Translation for JP 2009-012318 published Jan. 22, 2009.
English Language Abstract and Translation for JP 2001-334560 published Dec. 4, 2001.
Japanese Office Action issued in JP 2012-011204 on Feb. 2, 2016 with English Language Translation.
English Language Abstract and Machine translation of JP 2008-149569 published on Jul. 3, 2008.
English Language Abstract of WO 2007/034926 published on Jul. 3, 2007.
English Language Abstract and Machine translation of JP H06-210692 published on Aug. 2, 1994.

* cited by examiner

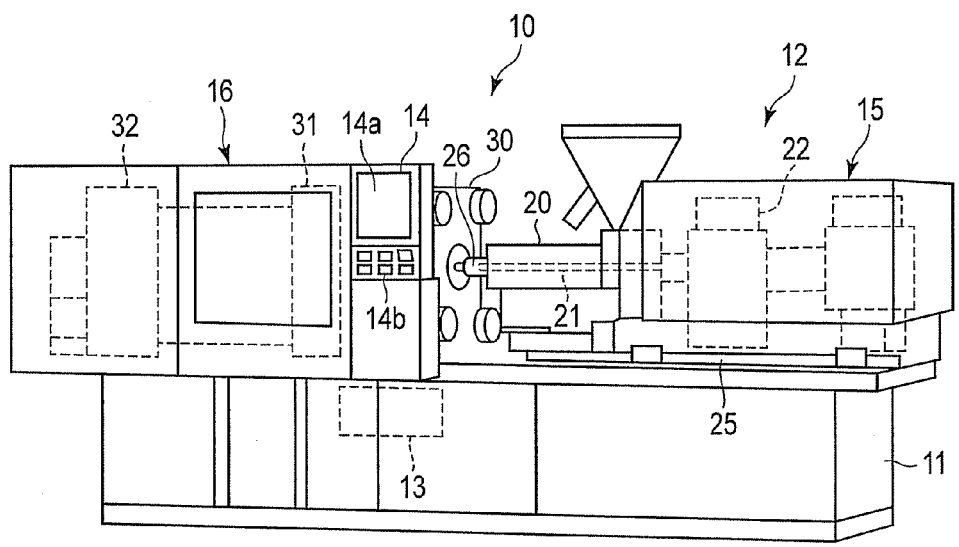
F I G. 1

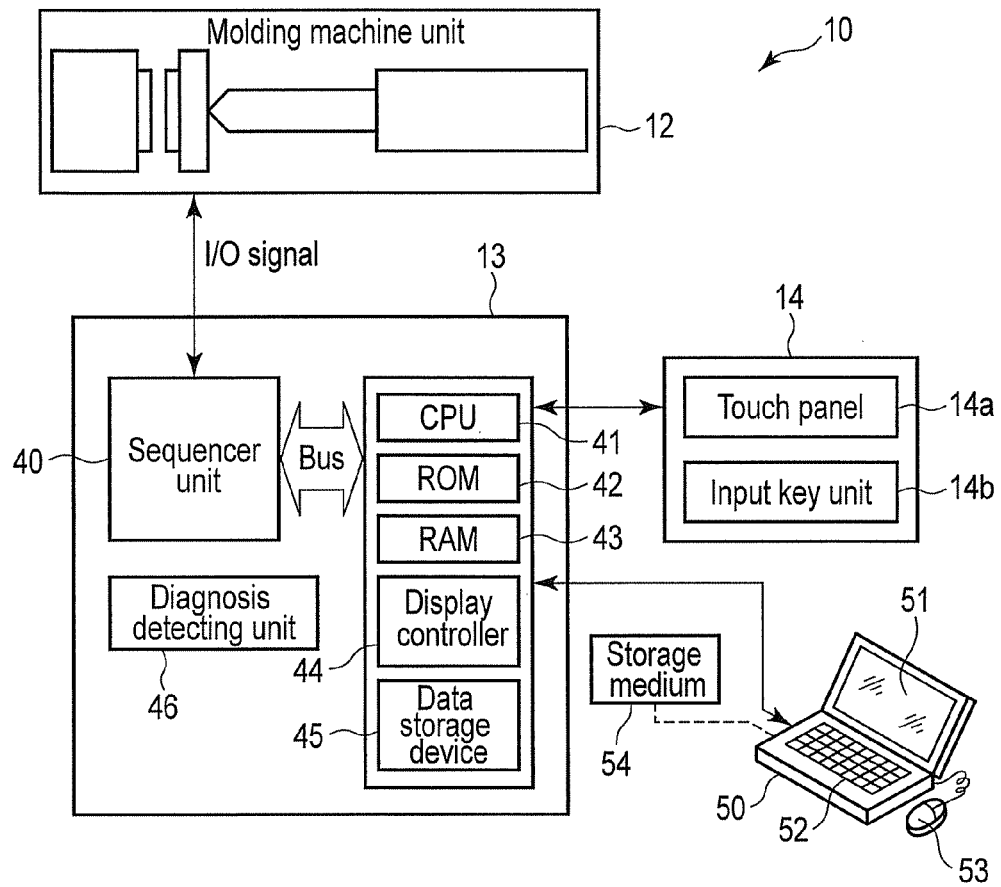
F I G. 2
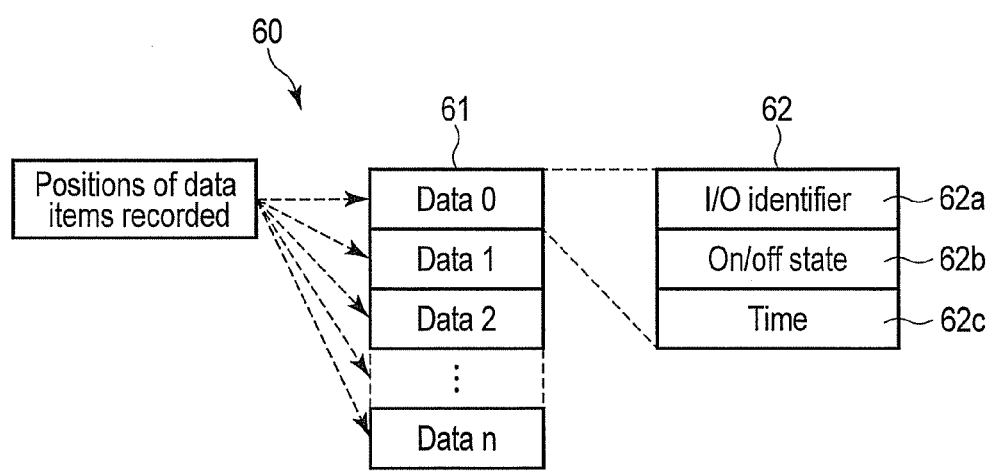
F I G. 3

LOGIC GRAPH DISPLAYING APPARATUS AND LOGIC GRAPH DISPLAY METHOD, BOTH FOR USE WITH MOLDING MACHINES

CROSS-REFERENCE TO RELATED APPLICATIONS

This application is based upon and claims the benefit of priority from prior Japanese Patent Application No. 2012-011204, filed Jan. 23, 2012, the entire contents of which are incorporated herein by reference.

BACKGROUND OF THE INVENTION

1. Field of the Invention

This invention relates to a logic graph displaying apparatus and a logic graph displaying method, both designed for use in molding machines such as injection molding machine and die casting machine, etc.

2. Description of the Related Art

Molding machines are known, such as injection molding machine and die casting machine, each of which uses a mold. The molding machine is configured to repeat a molding cycle comprising mold closing, material injection, pressure preserving and mold opening, which are performed in a prescribed order, based on a sequential program stored in a control unit, thereby to manufacture moldings at high efficiency. To such a molding machine, various molding conditions are set, which accord with the type and material of the molding, the mold used, and the like. In the injection molding machine, for example, the mold opening, material injection, pressure preserving and mold opening are performed in sequence in accordance with the input/output (I/O) signals of ladder logic, generated by the control unit. The I/O signals therefore change from time to time, in a specific sequence.

The injection molding machine may produce, in some cases, defective moldings because of various factors. The quality of the products depends on, for example, the material (e.g., resin), mold, mold clamping force, injection speed, pressure-preserving force, molding pulling force, melding point of the material, power supply voltage, ambient temperature, wear of the machine, inadequate electrical contacts. Further, the machine may fail to operate as desired, due to a little operating-timing error resulting from the I/O signals. The injection molding machine may produce defective moldings by these factors.

If the injection molding machine produces a defective molding, the turn-on and turn-off timings of every I/O signal are checked, thereby finding out the cause of the defective molding. To check the I/O signals, it is necessary to display, on a display screen, how each I/O signal changes. Various electrical on/off signals have hitherto been used in the injection molding machine. Injection molding machines have been long known, in which how the injection molding proceeds normally or not can be observed on the display screen of the control unit.

Jpn. Pat. Appln. KOKAI Publication No. 4-133712 (Patent Document 1), for example, discloses an injection molding machine in which the on-off data of the oil-pressure pump and the control valve is displayed in the form of a logic graph. In the injection machine disclosed in Jpn. Pat. Appln. KOKAI Publication No. 5-42575 (Patent Document 2), the graphic image of an analog signal and the logic graph of an on/off signal, used in the injection molding step, are displayed. Also in the injection molding machine disclosed in Jpn. Pat. Appln. KOKAI Publication No. 9-174636 (Patent Document 3), the graphic image of an analog signal and the logic graph of an on/off signal, used in the molding step, are displayed on the same screen. Further, in the injection machine disclosed in Jpn. Pat. Appln. KOKAI Publication No. 2004-199670 (Patent Document 4), a control unit is connected to a dedicated, external programmable logic controller (PLC), and records and displays the change each signal undergoes.

In the inventions of Patent Documents 1 to 3, the changes the signals undergo in one injection molding cycle are displayed on the screen. How each signal is switched on and off as scheduled can therefore be observed. How each signal changes on and off is displayed roughly, however, enabling the machine operator to grasp how one stroke of the injection molding step is proceeding. Since the screen usually has a limited number of pixels, and has a limited resolution. The screen may fail to display minute on/off change of the signal in some cases. A screen having dot size of 30 ms, for example, cannot display any signal change smaller than 30 ms.

Even if each signal changes on and off as scheduled, the injection molding machine may produce defective moldings. In this case, it would take a long time to find out the reason why. If the signal changes in an extremely short time because of the chattering due to an inadequate electrical contact or to the degradation of the valve, the change cannot be displayed on the conventional display screen.

The sequence program used may be defective and may disturb the on/off signal, but for a very short time. In this case, the signal disturbance cannot be displayed on the screen even if the on/off signal is sampled at as many intervals as possible in that very short time. From the analog waveform of a signal coming from a sensor, as displayed the screen, it is more difficult to detect such an instantaneous change of an on/off signal as specified above.

The cause of defective moldings may reside in the sequence program stored in the PLC (programmable logic controller) that is incorporated in the control unit. With the display screen disclosed in Patent Documents 1 to 3, it is difficult, in some cases, to analyze such a problem the program may have. Assume that the PLC stores a program that turns on the internal coil (contact) of a sequencer if several conditions are set in, for example, a ladder-logic sequence. The program turns a real relay contact on if the internal coil has been set to the condition specified for it. If any one of the conditions is not set for some reason, the coil will not be turned on. Then, the relay contact will not be turned on. Consequently, the relay contact seems behaving strangely even if its on/off state is stored and displayed at the control unit, disabling the operator to know the real trouble in the injection molding machine.

In the injection molding machine of Patent Document 4, the control unit is connected to an external device such as a dedicated sequencer. The behavior of the sequence program can therefore be minutely analyzed and inspected. The use of such a dedicated device, however, considerably increases the operating cost of the machine. Further, the operating efficiency of the machine at the production line is low, inevitably because the operator cannot observe the changes of each on/off signal, but at the display screen of the external device remote form the control unit of the injection molding machine.

BRIEF SUMMARY OF THE INVENTION

The present invention provides a logic graph displaying apparatus and a logic graph displaying method, both designed for use in molding machines, which can reliably detect and display changes of on/off signals and instantaneous even if the on/off signals change in an extremely short time.

A logic graph displaying apparatus according to one embodiment is designed for use in a molding machine that operates in accordance with on/off signals. The logic graph displaying apparatus has means for acquiring on/off data about a plurality of signal identifiers of the molding machine and for storing, in a memory, logging data containing on/off state and timing data representing the time each signal identifier is switched on or off. The logic graph displaying apparatus has a logging screen, too. The logging screen has identifier display parts for displaying the signal identifiers and logic-graph display parts for displaying logic graphs of the signal identifiers.

The logic graph displaying apparatus further has means for displaying an input window in which to input a signal identifier, when the identifier display part displaying the signal identifier on the logging screen is switched on. Still further, the logic graph displaying apparatus further has means for displaying a signal identifier in the identifier display part on the logging screen when the signal identifier is input in an input row provided in the input window, for reading the logging data associated with the signal identifier from the memory and for displaying the logic graph of the signal identifier in the logic-graph display part displayed on the logging screen.

So configured, the logic graph displaying apparatus according to the embodiment can reliably detect even minute changes in the on/off signals driving the molding machine, and can display these changes as logic graphs on the logging screen. The logic graph displaying apparatus therefore effectively enables an operator of the molding machine to determine the on/off states of I/O signals and to analyze a cause of, if any, defective moldings.

An example of the memory is a ring buffer in which the logging data is stored, written over the old logging data. An example of the logging screen has a pair of cursors on the logic graphs, and may have on/off display parts displaying whether two parts of a logic graph, which are positioned at the cursors, are on or off. The logic graph displaying apparatus may further have means for moving the cursors independently.

A preferred embodiment has means for magnifying the logic graphs on the logging screen. The logging screen has a plurality of grids displayed at regular intervals. The embodiment may have means for changing the number of grids on the logging screen. The embodiment may further have means for rearranging the logic graphs on the logging screen.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a perspective view showing an example of a molding machine;

FIG. 2 is a block diagram of the molding machine shown in FIG. 1;

FIG. 3 is a diagram schematically showing the configuration of a ring buffer;

DETAILED DESCRIPTION OF THE INVENTION

Figure 4:
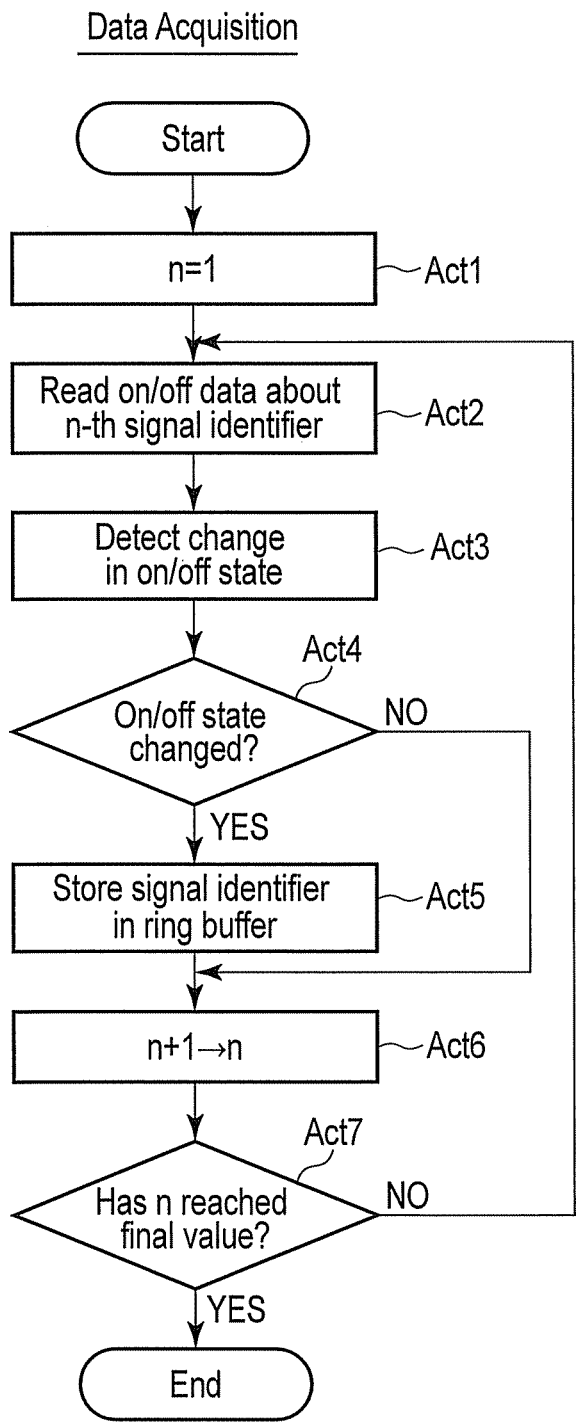
FIG. 4 is a flowchart showing an exemplary logging data acquisition cycle performed in the molding machine.

One embodiment of this invention will be described below, with reference to FIG. 1 to FIG. 13.

FIG. 1 shows an injection molding machine 10, which is an example of a molding machine. Hereinafter, the injection molding machine 10 will be called "molding machine 10." Although the molding machine 10 is an electric injection molding machine, this invention may be applied to a hydraulic injection molding machine.

The molding machine 10 comprises a body 11, a molding machine unit 12, a control unit 13, and an operation display unit 14. The body 11 includes a frame used as base. The molding machine unit 12 is arranged on the body 11. The control unit 13 incorporates a computer program and the like for controlling the injection molding. The operation display unit 14 functions as a human-machine interface unit. The molding machine unit 12 includes an injection unit 15 and a mold clamping unit 16. Various peripheral apparatuses, including a molding extracting mechanism, are attached to the molding machine unit 12.

The operation display unit 14 includes a touch panel 14a and an input key section 14b. The touch panel 14a has a display screen configured to display various items of information. The touch panel 14a displays various switch sections, any one of which may be touched to input the data associated with it. The input key section 14b has switches and lamps, which are arranged in an array. The switches may be operated to operate and stop the molding machine 10.

An example of the injection unit 15 shown in FIG. 1 comprises a barrel 20, a screw 21, a screw driving mechanism 22 and a heater (not shown). The screw driving mechanism 22 drives the screw 21. The heater heats the molding material such as resin. The screw 21 can rotate and move back and forth in the barrel 20. The injection unit 15 may run back and forth, along the rails 25 laid on the body 11. A nozzle 26 is provided at the distal end of the barrel 20.

The mold clamping unit 16 includes a fixed die plate 30, a movable die plate 31, and a mold-clamping drive mechanism 32. A fixed mold (not shown) is secured to the fixed die plate 30. A movable mold (not shown) is secured to the movable die plate 31. When the mold-clamping drive mechanism 32 drives the movable die plate 31, the movable mold is opened or closed relative to the fixed mold. While the movable mold and the fixed mold remain clamped together, a cavity for molding is formed between them.

The injection unit 15 is controlled by the control unit 13. The injection unit 15 injects molten material which is melted in the barrel 20 into the cavity. A temperature sensor is provided on the barrel 20. The output of the temperature sensor is fed back to a temperature control unit of the control unit 13. The molten material in the barrel 20 is thereby maintained at a prescribed temperature.

FIG. 2 is a block diagram showing the molding machine unit 12, control unit 13, operation display unit 14, etc. of the molding machine 10. The control unit 13 includes a sequencer unit 40, a central processing unit (CPU) 41, a read only memory (ROM) 42, a random access memory (RAM) 43, a display controller 44, and a data storage device 45. The CPU 41 is used as control operation means. The ROM 42 is one type of nonvolatile memories. The RAM 43 is used as work memory. The sequencer unit 40 receives and transmits input/output (I/O) signals from and to the molding machine unit 12.

The ROM 42 of the control unit 13 stores a program that drives the molding machine 10 in a prescribed sequence. In accordance with program, the sequencer unit 40 outputs I/O signals in a predetermined order to the molding machine unit 12 to operate the injection unit 15, mold clamping unit 16 and peripheral apparatuses (including the molding extracting mechanism). In response to these I/O signals, the molding machine 10 performs a molding cycle that comprises mold closing, material injection, pressure preserving, measuring and mold opening. That is, the control unit 13 outputs I/O signals for molding and some other actions to the molding machine unit 12 and to some other components. The data storage device 45 stores data representing various molding conditions for example.

The control unit 13 has a diagnosis detecting unit 46. The diagnosis detecting unit 46 keeps monitoring a pressure, position, etc., for a specific period while the molding machine 10 is operating, on the basis of the detection signals coming from various sensors. The diagnosis detecting unit 46 has the function of displaying an alarm image (not shown) at the operation display unit 14 when a trouble is detected.

The control unit 13 according to this embodiment can be connected via a communication interface (not shown) to a personal computer 50. The personal computer 50 includes a display unit 51 having a display panel, an input unit 52 having a keyboard, and a pointing device 53 such as a mouse. The personal computer 50 comprises a storage medium 54, which can be removed from the computer, if necessary.

The data storage device 45 includes a ring buffer 60, a part of which is schematically shown in FIG. 3. As shown in FIG. 3, the ring buffer 60 has an index section 61 and a logging data section 62. The index section 61 stores a plurality of data numbers. The logging data section 62 stores the logging data for each data number.

The logging data section 62 of the ring buffer 60 includes an identifier storage section 62a, an on/off state storage section 62b, and a time storage section 62c. The identifier storage section 62a stores the signal identifier (i.e., I/O identifier) of any signal switched in terms of on/off state. The on/off state storage section 62b stores the data showing whether the signal is on or off. The time storage section 62c stores the data representing the time when the signal is switched on or off. The "on" or "off" state of the signal is equivalent to the logic output of a ladder circuit in, for example, the sequencer unit 40. The storage capacity of the ring buffer 60 is limited. Accordingly, new data is therefore written over the old data in the storage sections 62a, 62b and 62c, which always store the latest data. Thus, a data acquisition cycle is achieved, as will be explained below.

The flowchart of FIG. 4 shows an exemplary process of storing the logging data in the ring buffer 60 (i.e., data acquisition cycle). As shown in FIG. 4, the count (n) is set to 1 in Act 1. In Act 2, the data (i.e., on/off data) is read, which represents whether the I/O signal associated with the n-th (e.g., first) signal identifier is on or off. In Act 3, changing of the on/off state of the I/O signal is detected.

In Act 4, it is determined whether the I/O signal has changed in on/off state. If the I/O signal is found to have changed, the logging data of the signal identifier of the I/O signal is stored in the ring buffer 60 in Act 5. More specifically, the signal identifier of the I/O signal, which has changed in on/off state, is stored in the identifier storage section 62a of the ring buffer 60. Further, the data showing whether the I/O signal has been switched on or off is stored in the on/off state storage section 62b, and the data showing whether the time when the I/O signal was switched on or off is stored in the time storage section 62c.

In Act 6 shown in FIG. 4, the count (n) is increased by one. In Act 7, it is determined whether the count has reached the final value (n). If the count has not reached the final value, the process returns to Act 2. Act 2, Act 3 and Act 4 are repeated. As a result, the logging data of the next signal identifier (n-th signal identifier) is stored in the ring buffer 60 (Act 5). In Act 7, the count may reach the final value. In this case, the process is terminated.

Thus, in the control unit 13, the on/off data about all signal identifiers are acquired one after another at prescribed intervals. Every time each signal changes in the on/off state, its identifier (I/O identifier), its on/off state data, and its on/off time are stored (or over-written) in the ring buffer 60. This data writing is performed in accordance with the computer program installed in the control unit 13. The logging data stored in the ring buffer 60 can be transferred to the memory incorporated in the personal computer 50 (shown in FIG. 2) or can be held in the storage medium 54.

Figure 5:
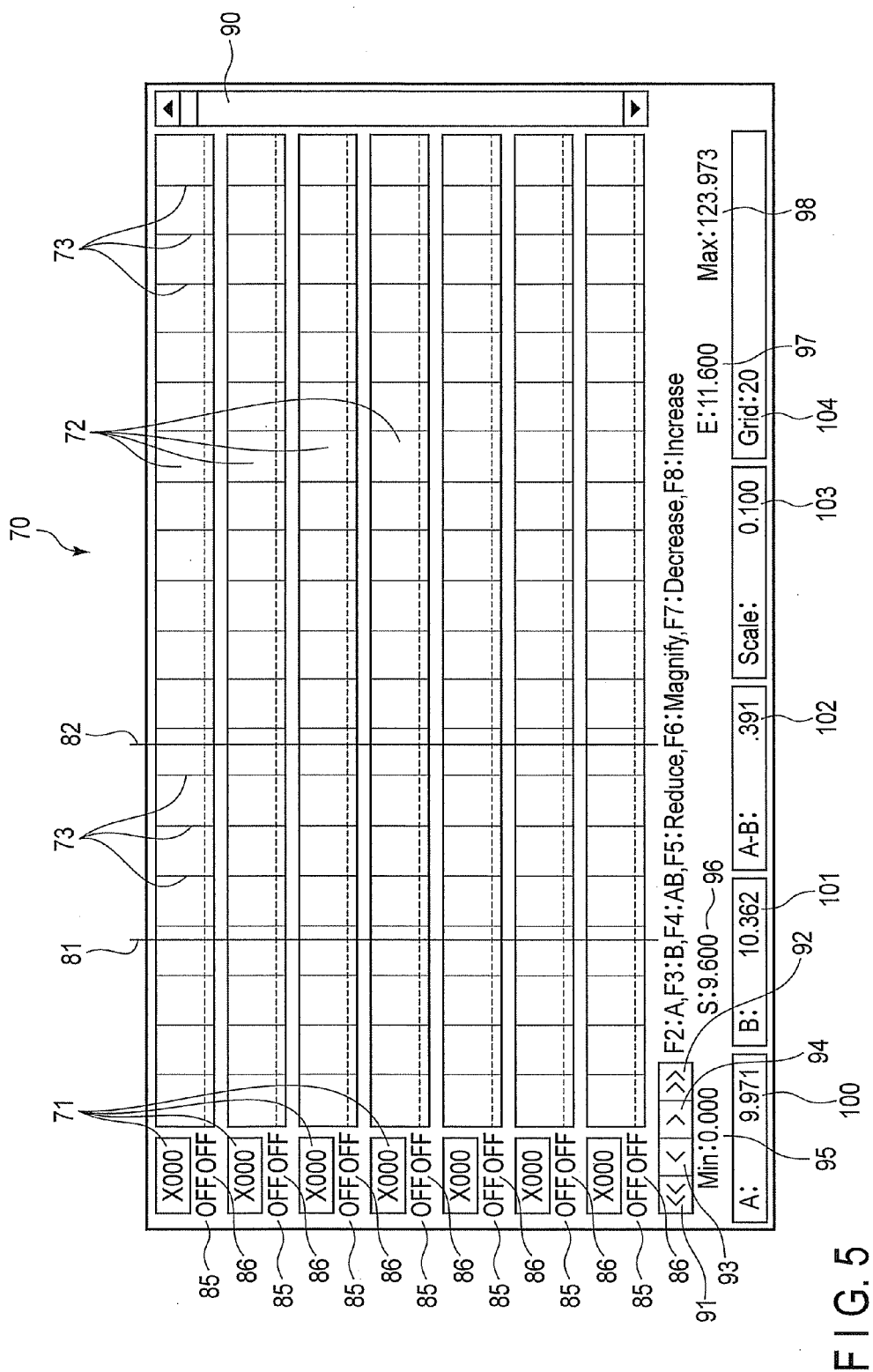
FIG. 5 is a diagram showing an exemplary logging screen according to an embodiment of this invention.

It may be necessary to examine the on/off state of the I/O signal. In this case, the display unit 51 of the personal computer 50 (or the operation display unit 14) displays such a logging screen 70 as shown in FIG. 5. If the logging data of the signal identifier that should be checked is processed in the personal computer 50, display unit 51 (or the operation display unit 14) will display the logic graph of the signal identifier that should be checked.

FIG. 5 shows an exemplary logging screen 70, on which a logging graph has not displayed yet. The logging screen 70 has, at the left side, identifier display parts 71 for displaying signal identifiers (I/O identifiers) from upside to downward, respectively. Before signal identifiers are input, the identifier display part 71 displays a default value of, for example, "X0000" or "X****"

On the right side of each identifier display parts 71, logic-graph display parts 72 are provided. The logic-graph display parts 72, logic graphs (shown in FIG. 9 to FIG. 13), which are respectively associated with the signal identifiers displayed in the identifier display parts 71. The logging screen 70 displays also a plurality of grids 73 (20 grids in FIG. 5), which are arranged at regular intervals, forming a lattice pattern. The logging screen 70 displays a pair of cursors 81 and 82, too. The grids 73 are positional references the operator may use to move the cursors 81 and 82. Both the first cursor 81 and the second cursor 82 extend in vertical direction, on all logic-graph display parts 72.

At the lower-left side of each identifier display part 71, a first on/off display parts 85 is arranged. The first on/off display part 85 displays whether the position the first cursor 81 points on the logic graph (shown in FIG. 9 to FIG. 13) displayed at a logic-graph display parts 72 is on or off. At the lower-right side of each identifier display part 71, a second on/off display parts 86 is arranged. The second on/off display part 86 displays whether the position the second cursor 82 points on the logic graph is on or off.

On the right edge area of the logging screen 70, a vertical scroll bar 90 is provided. The vertical scroll bar 90 is use to bring a hidden part of the logic graph into the logging screen 70. The pointing device 53 (FIG. 2), such as a mouse, may be used to move a sliding button on the vertical scroll bar 90, thereby to bring a hidden part of the logic graph appear into the logging screen 70.

On the lower section of the logging screen 70, a preceding-screen button 91, a following-screen button 92, a forward button 93, a backward button 94, first to fourth time display indicators 95, 96, 97 and 98, cursor-position display parts 100 and 101, a cursor-interval display part 102, a scale display part 103, and a grid-number display part 104.

The preceding-screen button 91 may be used to display the logging screen immediately preceding the logging screen 70 now displayed. The following-screen button 92 may be used to display the logging screen immediately following the logging screen 70 now displayed. When used, the forward button 93 moves the logic graph forward by one grid. When used, the backward button 94 moves the logic graph backward by one grid. The first time display indicator 95 displays the time the earliest logging data was generated. The second time display indicator 96 displays the time the head logging data now displayed was generated. The third time display indicator 97 displays the time the tail logging data now displayed was generated. The fourth time display indicator 98 displays the time the latest logging data was generated.

One cursor-position display part 100 displays the position (time) of the first cursor 81. The other cursor-position display part 101 displays the position (time) of the second cursor 82. The cursor-interval display part 102 displays the interval (time) between the cursors 81 and 82. The scale display part 103 displays the interval (time) between the grids. The grid-number display part 104 displays the number of the grids, displayed at present on the logging screen 70. The value the scale display part 103 displays is the time per grid (sec).

Figure 6:
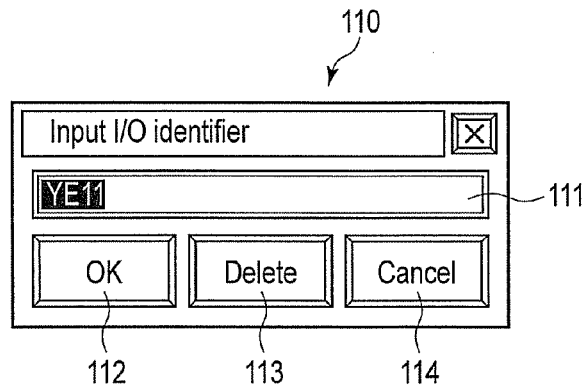
FIG. 6 is a diagram showing an example of an input window.

The operator may clicks any one of the identifier display part 71 displayed on the logging screen 70 of FIG. 5, by using the pointing device 53 (FIG. 2) such as mouse. In this case, such an input window 110 as shown in FIG. 6 is displayed. That is, the control unit of the personal computer 50 according to the embodiment incorporates the computer program which displays the input window 110 when any identifier display part 71 on the logging screen 70 is clicked.

FIG. 6 shows an example of the input window 110. This input window 110 includes an input row 111, in which a signal identifier may be input. The operator can use the input unit 52 (shown in FIG. 2) having a keyboard, to input any desired signal identifier in the input row 111 of the input window 110. Signal identifier "YE11" is input in the input row 111 in the case shown in FIG. 6. After inputting the signal identifier, the user may click the OK button 112 displayed in the input window 110. Then, the signal identifier input is set. If the operator clicks the delete button 113 displayed also in the input window 110, the signal identifier set will be deleted. If the operator clicks the cancel button 114 displayed also in the input window 110, the signal identifier being input will be cancelled.

If the operator first inputs a signal identifier in the input window 110 and then clicks the OK button 112, the display will be switched from the input window 110, back to the logging screen 70. The signal identifier the operator has input is displayed at the identifier display part 71. Of the logging data items transferred from the ring buffer 60 to the personal computer 50, the logging data item of the signal identifier just input is used, generating a logic graph (signal on/off history). The logic graph, thus generated, is displayed at the associated logic-graph display part 72 of the logging screen 70.

Figure 7:
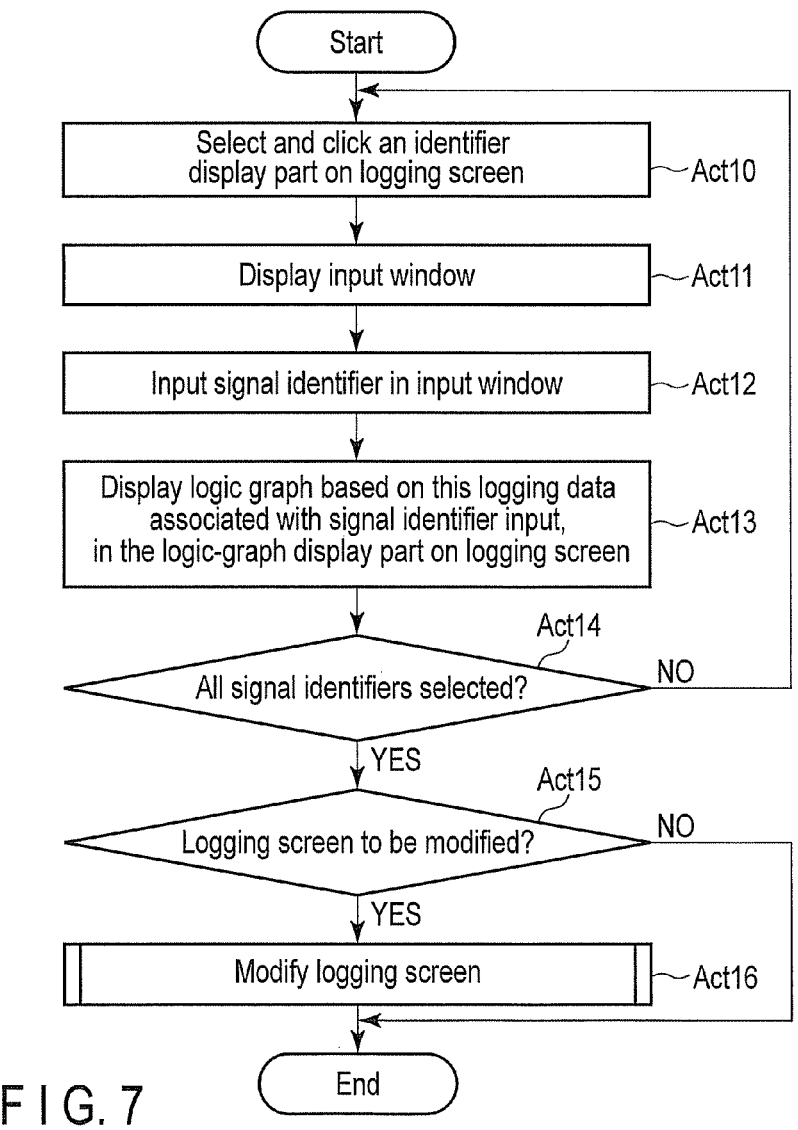
FIG. 7 is a flowchart showing the sequence of a logic-graph displaying process.

The flowchart of FIG. 7 shows an exemplary sequence in which the control unit of the personal computer 50 processes data to display a logic graph on the logging screen 70. This data processing (i.e., process of generating a logic graph) will be explained. Note that the computer program for generating and displaying the logic graph may be installed in the control unit 13 of the molding machine 10.

As shown in FIG. 7, one of the identifier display parts 71 shown in the logging screen 70 (for example, the uppermost identifier display parts 71) is clicked in Act 10, as the operator uses the pointing device 53 (shown in FIG. 2) is operated. When the identifier display part 71 is clicked, the input window 110 of FIG. 6 is displayed in Act 11. In Act 12, the operator inputs a signal identifier (for example, the signal identifier the operator wants to examine first for its on/off history) in the input window 110. The operator then clicks the OK button 112, whereby the signal identifier is displayed in the uppermost identifier display parts 71.

Next, the operator clicks the OK button 112 displayed in the input window 110, setting the signal identifier. Then, the display is switched from the input window 110, back to the logging screen 70. The logging data associated with the signal identifier is therefore read from the ring buffer 60. In Act 13, the logic graph (i.e., history of the on/off signal) based on this logging data is displayed in the uppermost logic-graph display part 72. The logging data may be read from the memory incorporated in the personal computer 50, which stores the same data as the ring buffer 60 stores.

As shown in FIG. 7, in Act 14 it is determined whether all signal identifiers to examine have been input or not. If all signal identifiers have been input, the process goes to Act 15. Otherwise, the process returns to Act 10. Next, a second signal identifier is input in the same way as the first signal identifier, by first clicking the associated identifier display part 71 displayed in the logging screen 70 and then using the input window 110 (Act 11 and Act 12). Then, the operator clicks the OK button 112, displaying the logic graph of the second signal identifier in a second logic-graph display part, e.g., the second uppermost logic-graph display part 72. Other signal identifiers, i.e., third signal et seq., are displayed in other logic-graph display parts 72, respectively, in the same way as the first and second signal identifiers, as Act 10 to Act 13 are repeatedly performed. Thus, the logic graphs of all signal identifiers input are displayed on the logging screen 70.

Figure 8:
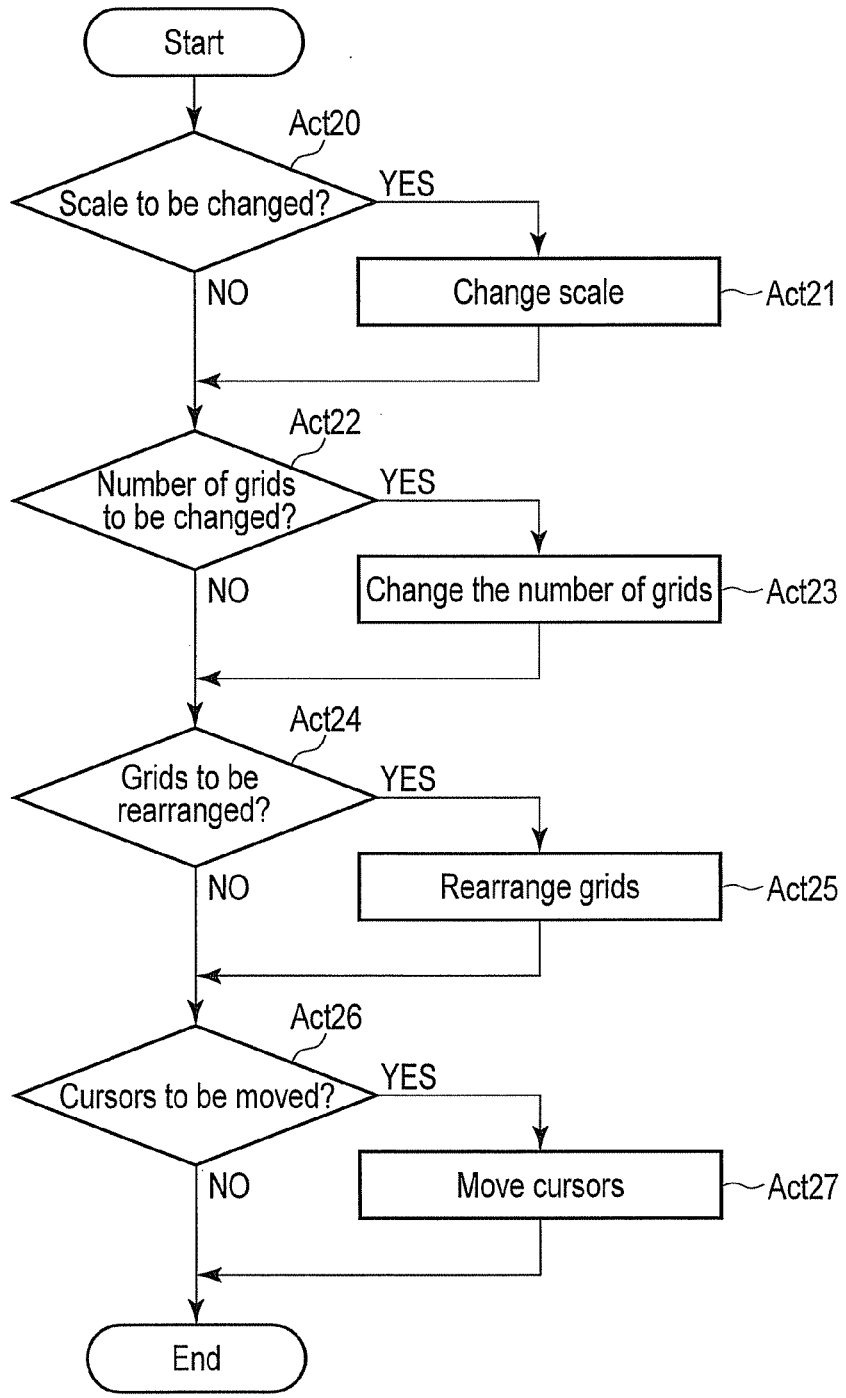
FIG. 8 is a flowchart showing an exemplary sequence of a logging-screen modifying process.

After the logic graphs have been so displayed on the logging screen 70, the process goes to Act 15. In Act 15, it is determined whether the logging screen 70 should be modified or not. If the logging screen 70 should be modified, the process goes to Act 16. In Act 16, the logging screen 70 is modified. FIG. 8 is a flowchart showing an exemplary sequence of the logging-screen modifying process (Act 16). The logging-screen modifying process (Act 16) of logging screen 70 will be explained later in detail.

Figure 9:
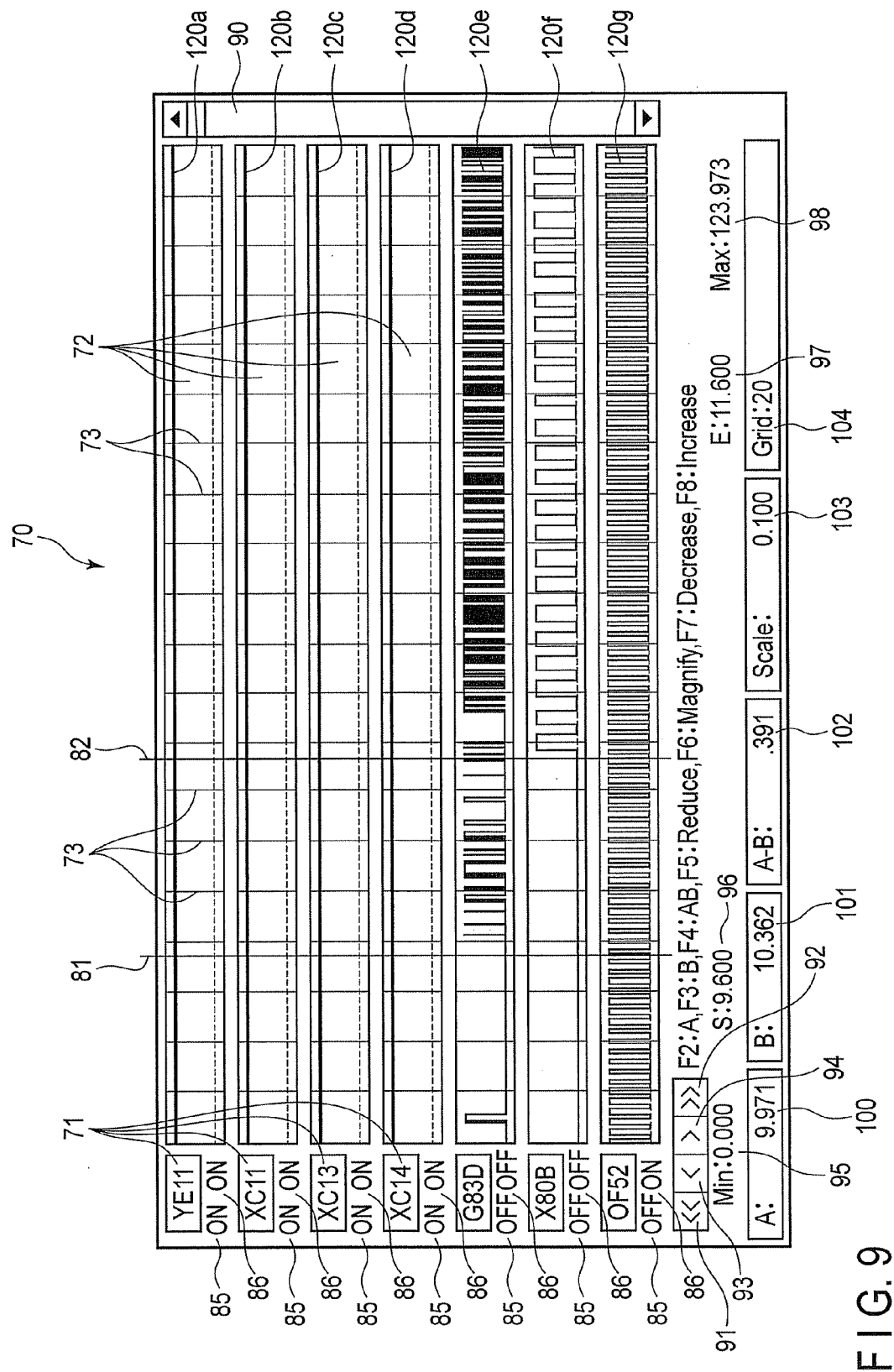
FIG. 9 is a diagram showing an exemplary logging screen, displaying test logging graphs.

FIG. 9 is a diagram showing an exemplary logging screen 70, displaying test logging graphs 120a to 120g. Of these test logging graphs 120a to 120g, the upper four logic graphs 120a, 120b, 120c and 120d remain on. Therefore, the on/off display parts 85 and 86 show "ON" at the positions of the first and second cursor 81 and 82.

In the lower three logic graphs shown in FIG. 9, i.e., fifth to seventh logic graphs 120e, 120f and 120g, counted from above, the on/off state alternately changes in a short time. The first and second on/off display parts 85 and 86 of the fifth logic graph 120e display "OFF," and the first and second on/off display parts 85 and 86 of the sixth logic graph 120f display "OFF," too. In the case of the seventh logic graph 120g shown in FIG. 9, the first and second on/off display parts 85 and 86 display "OFF" and "ON," respectively. Thus, the on/off display parts 85 and 86 shows whether each logic graph is on or off at cursors 81 and 82, respectively. Hence, the operator can correctly determine whether the signal is on or off, in spite of the limited number of pixels (i.e., limited resolution) of the logging screen 70.

Figure 10:
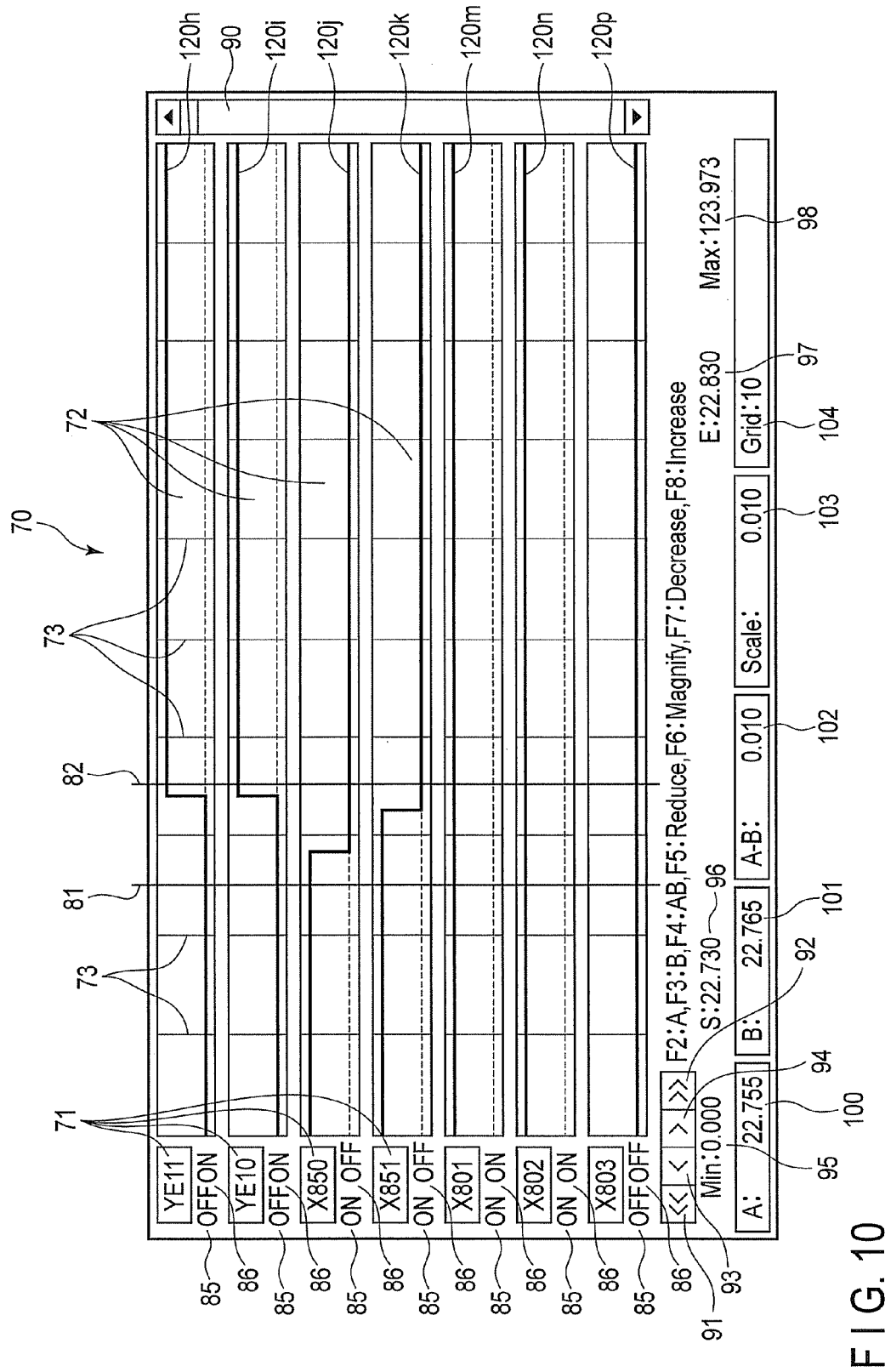
FIG. 10 is a diagram showing another exemplary logging screen displaying logging graphs.

FIG. 10 shows other exemplary logic graphs displayed on the logging screen 70. As seen from FIG. 10, the first to fourth logic graphs 120h, 120i, 120j and 120k, i.e., upper four logic graphs on the logging screen 70, change in on/off state between the cursors 81 and 82. The fifth logic graph 120m and the sixth logic graph 120n remain on. The seventh logic graph 120p remains off.

As described above, the process goes to Act 15 (FIG. 7) if the logic graph associated with each signal identifier is displayed in the associated logic-graph display parts 72 on the logging screen 70. To modify the logging screen 70, the process goes to Act 16. In Act 16, the logging screen 70 is modified.

The flowchart of FIG. 8 shows an exemplary sequence of the logging-screen modifying process (Act 16). To magnify, for example, the logic graphs 120h to 120p displayed on the logging screen 70 shown in FIG. 10, the process goes from Act 20 shown in FIG. 8 to Act 21 also shown in FIG. 8, whereby a scale changing process is performed.

Figure 11:
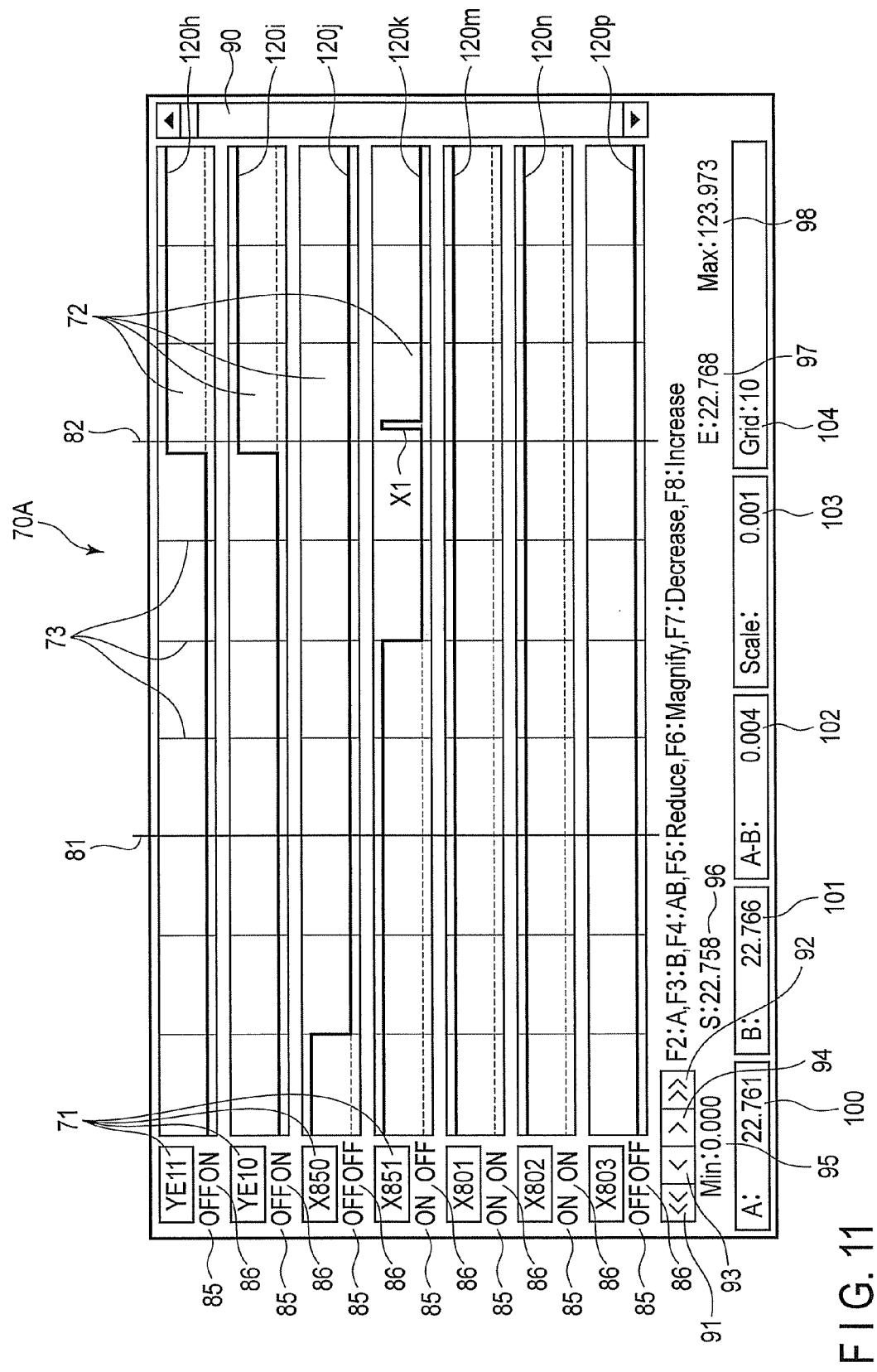
FIG. 11 is a diagram showing an exemplary logging screen displaying the logging graph shown in FIG. 10, in a magnified form.

In Act 21 shown in FIG. 8, the pointing device 53 (FIG. 2), such as a mouse, is operated, designating the scale display part 103. The operator further input a desirable scale value at the input unit 52. Then, the logging screen 70 changes to a magnified logging screen 70A as shown in FIG. 11. On the magnified logging screen 70A, the operator can see the on/off history that cannot be displayed on the logging screen 70 of the ordinary scale (i.e., screen 70 of FIG. 10).

On the logging screen 70A of FIG. 11, each logic graph is magnified. The fourth logic graph, counted downwards, has a part X1 that instantaneously "ON," on the right of the second cursor 82. This part X1 may generate abnormality in the molding signal. By contrast, the logging screen 70 of FIG. 10 is displayed by the ordinary scale. Accordingly on the logging screen 70, the logic graph 120k remains "off," even at the part on the right of the second cursor 82, because of the limited number of pixels (i.e., limited resolution) of the logging screen 70. Consequently, the operator cannot recognize the abnormal part X1 of the logic graph, on the logging screen 70 of the ordinary scale.

On the logging screen 70A of FIG. 11, which is magnified, whether the positions of the cursors 81 and 82 are on or off is clearly displayed as "ON" or "OFF" at the on/off display parts 85 and 86 of the identifier display parts 71, respectively. This enables the operator to determine correctly whether the change of signal in minute time is on or off, in spite of the limited number of pixels (i.e., limited resolution) of the logging screen 70.

Figure 12:
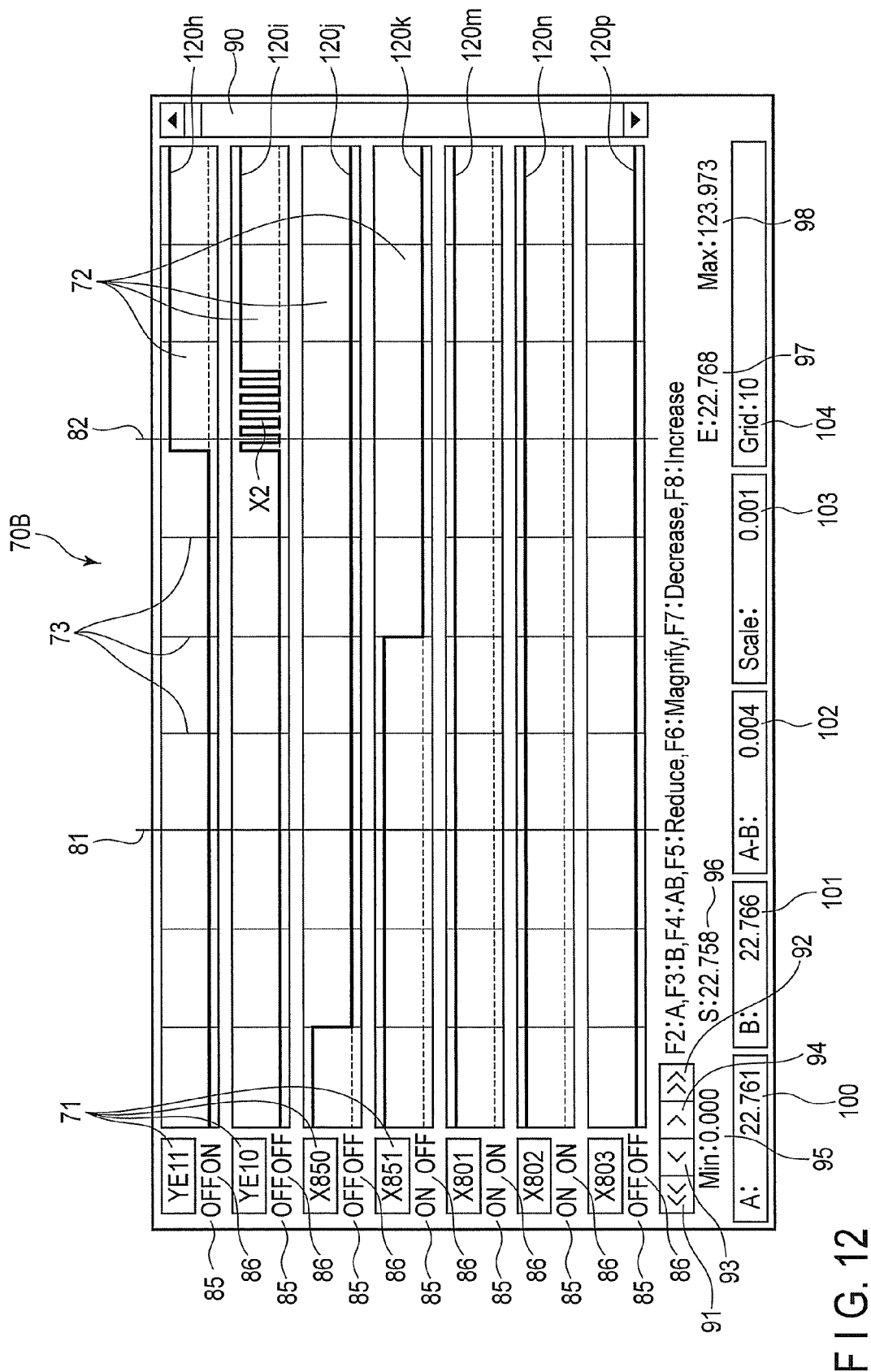
FIG. 12 is a diagram showing an exemplary logging screen displaying another logging graph in a magnified form.

FIG. 12 shows an exemplary logging screen 70B which is also magnified. On this logging screen 70B, the second logic graph 120i, counted downwards, has a part X2, i.e., chattering part, (existing near the second cursor 82), which is switched alternately on and off in a very short time. One of the causes of this chattering is, for example, an inadequate electrical contact. In some cases, the part X2 switched alternately on and off in a very short time cannot be displayed on the logging screen 70 of the ordinary scale.

By contrast, on the logging screen 70B magnified as shown in FIG. 12, the part X2 switched alternately on and off in a very short time can be recognized well on the screen. In addition, whether the positions of the cursors 81 and 82 are on or off is displayed as "ON" or "OFF" at the on/off display parts 85 and 86 of the logging screen 70B, respectively. How the on/off state changes minutely can therefore be correctly determined, despite the limited number of pixels (i.e., limited resolution) of the logging screen 70.

To change the number of grids on the logging screen 70, the process goes from Act 22 to Act 23 (see FIG. 8). In Act 23, the number of grids is changed. The pointing device 53 (FIG. 2), such as a mouse, is used for example, designating the grid-number display part 104. Then, the operator inputs a desired number of grids by the input unit 52. The number of grids can thereby be changed. The time span any logic graph displayed on the logging screen 70 is the product of the number of grids and the scale (i.e., grids×scale).

To change the order in which the logic graphs 120h to 120p are arranged on the logging screen 70A shown in FIG. 11, the process goes from Act 24 to Act 25 (see FIG. 8). In Act 25, the logic graphs 120h to 120p of FIG. 11 are rearranged so that the nearer the cursor 81 or 82, the upper position each logic graph assumes. As a result, the logging screen 70A changes to a logging screen 70C shown in FIG. 13. On the logging screen 70C, the operator can more easily compare the history of one on/off signal with that of any other on/off signal.

Figure 13:
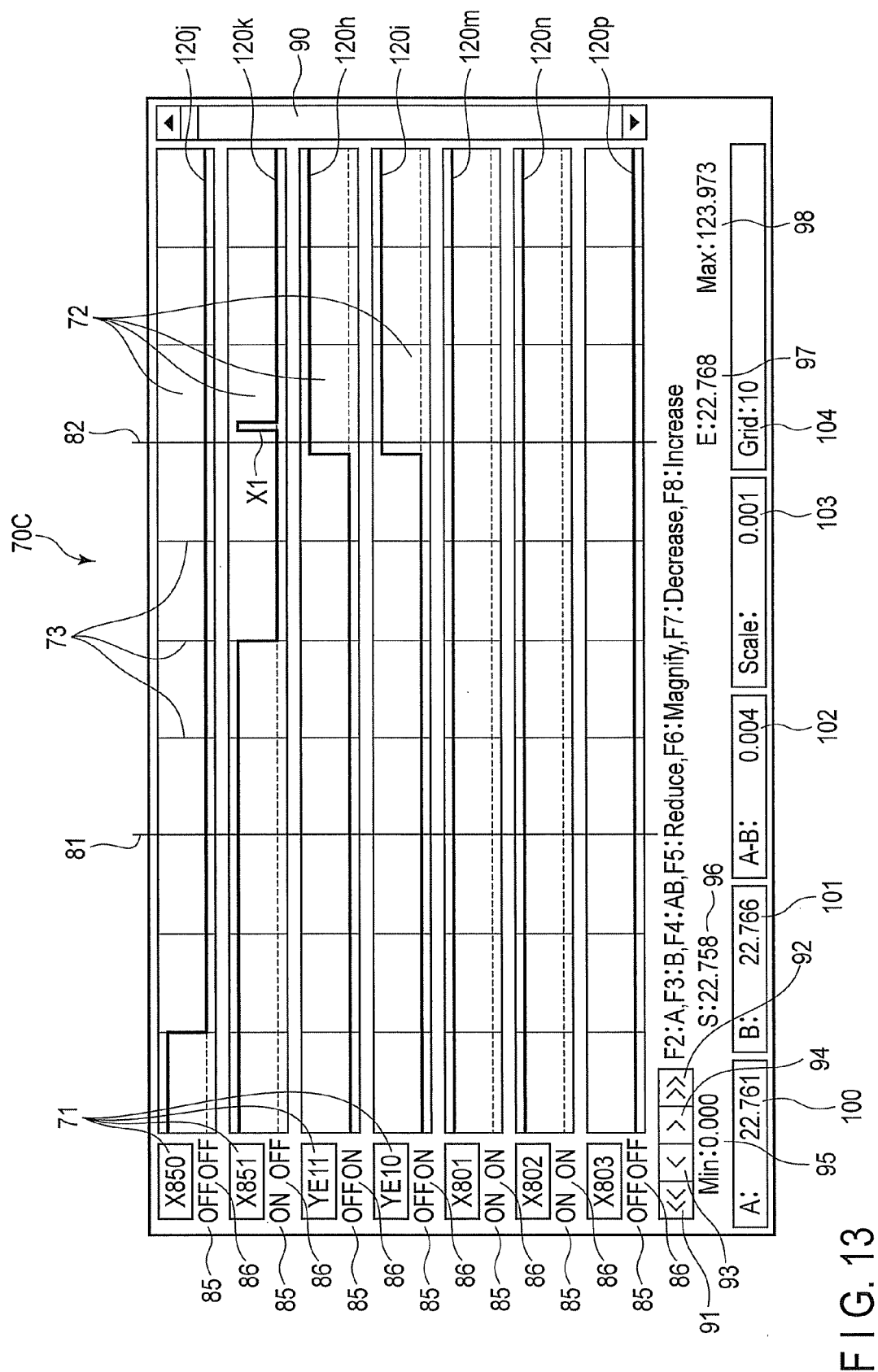
FIG. 13 is a diagram showing an exemplary logging screen displaying a rearranged logic graph of FIG. 11.

The logging screen 70C of FIG. 13 is an example on which the logic graphs 120h, 120i, 120j and 120k assume positions different from those they assume in the logging screen 70A of FIG. 11. On the logging screen 70C, the logic graphs 120j, 120k, 120h and 120i associated with the signal identifiers "S850," "X851," "YE11" and "YE10," respectively, are arranged downward from top in the order they are mentioned.

Now that the logic graphs have been so rearranged and displayed, the operator can more efficiently find any signal identifier that may have generated abnormality in the molding signal. Further, the history of an on/off signal, which cannot be determined from one logic graph only, can be efficiently analyzed for the disturbance or discordance of the on/off signal, by merely comparing each logic graph with another, while using the cursors 81 and 82 as positional references.

In the case where the positions of the cursors 81 and 82 must be changed, the process may go from Act 26 to Act 27 (see FIG. 8). In Act 27, the positions of the cursors are changed. That is, the pointing device 53 (FIG. 2), such as a mouse, may be used, moving the cursors 81 and 82 independently, or moving the cursors 81 and 82 at the same time and in the same direction, maintaining the distance between them.

The control unit of the personal computer 50 may store the computer program that perform screen processing different from the screen processing explained above. Moreover, the sequence of processing the screen may differ from the sequence specified above.

As has been described, the on/off data about all signal identifiers related to the molding are acquired, and the logging data about these signal identifiers is stored in the ring buffer 60. Any on/off signal whose identifier should be checked is selected as needed. The logic graph of the on/of signal can thereby be displayed on the logging screen. In addition, the logic graph can be magnified and rearranged, if necessary, to be well observed. Hence, the signal on/off history can be reliably displayed, not influenced by the resolution (the limited number of pixels) of the logging screen.

In the embodiment described above, the personal computer 50 processes the logging data stored in the ring buffer 60 of the data storage device 45, and the logic graphs are displayed at the display unit 51 of the personal computer 50. The logic graph displaying apparatus according to the embodiment includes a ring buffer 60 and a control unit of the personal computer 50. Nonetheless, in another embodiment of this invention, the logging data stored in the ring buffer 60 may be processed by the control unit 13 of the molding machine 10, and the logging graphs generated may be displayed at the operation display unit 14 of the molding machine 10. Furthermore, the logging data stored in the ring buffer 60 may be stored in the storage medium 54, and a data processing apparatus other than the personal computer 50 may, as needed, generate logic graphs, and the logic graphs may then be displayed.

Needless to say, this invention can be modified to practice in various embodiments, by changing, in design, not only the signal identifiers to display at the identifier display parts and the logic graphs to display at the logic-graph display parts, but also the logging images and input windows. Moreover, this invention can also be applied to any other molding machine using a mold, such as a die casting machine other than injection molding machines.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A logic graph displaying apparatus for use in a molding machine that operates in accordance with on/off signals, the apparatus comprising:
    a memory;
    a control unit configured to acquire all on/off data generated by a molding sequence performed by the molding machine, the on/off data being associated with a plurality of signal identifiers, and to store, in the memory, logging data containing on/off state and timing data representing the time each signal identifier is switched on or off; and
    a logging screen having identifier display parts for displaying the signal identifiers and logic-graph display parts for displaying logic graphs of the signal identifiers; wherein
    the control unit is further configured to:
        display an input window in which to input a signal identifier, on the logging screen, when the identifier display part displaying the signal identifier on the logging screen is switched on;
        display a signal identifier in the identifier display part on the logging screen when the signal identifier is input, in an input row provided in the input window;
        read logging data associated with the signal identifier from the memory; and
        display the logic graph of the signal identifier in the logic-graph display part displayed on the logging screen.

2. The logic graph displaying apparatus according to claim 1, wherein the memory is a ring buffer in which the logging data is written over old logging data, thereby to store the logging data.

3. The logic graph displaying apparatus according to claim 2, wherein the control unit is further configured to magnify the logic graphs displayed on the logging screen.

4. The logic graph displaying apparatus according to claim 2, in which the logging screen has a plurality of grids displayed at regular intervals, and wherein the control unit is further configured to change the number of grids displayed on the logging screen.

5. The logic graph displaying apparatus according to claim 2, wherein the control unit is further configured to rearrange the logic graphs on the logging screen.

6. The logic graph displaying apparatus according to claim 2, wherein the logging screen has a pair of cursors displayed on the logic graphs and also on/off display parts displaying whether two parts of a logic graph, which are positioned at the cursors, respectively, are on or off.

7. The logic graph displaying apparatus according to claim 6, wherein the control unit is further configured to magnify the logic graphs displayed on the logging screen.

8. The logic graph displaying apparatus according to claim 6, in which the logging screen has a plurality of grids displayed at regular intervals, and wherein the control unit is further configured to change the number of grids displayed on the logging screen.

9. The logic graph displaying apparatus according to claim 6, wherein the control unit is further configured to rearrange the logic graphs on the logging screen.

10. The logic graph displaying apparatus according to claim 6, wherein the control unit is further configured to move the cursors independently.

11. The logic graph displaying apparatus according to claim 1, wherein the logging screen has a pair of cursors displayed on the logic graphs and also on/off display parts displaying whether two parts of a logic graph, which are positioned at the cursors, respectively, are on or off.

12. The logic graph displaying apparatus according to claim 11, wherein the control unit is further configured to magnify the logic graphs displayed on the logging screen.

13. The logic graph displaying apparatus according to claim 11, in which the logging screen has a plurality of grids displayed at regular intervals, and wherein the control unit is further configured to change the number of grids displayed on the logging screen.

14. The logic graph displaying apparatus according to claim 11, wherein the control unit is further configured to rearrange the logic graphs on the logging screen.

15. The logic graph displaying apparatus according to claim 11, wherein the control unit is further configured to move the cursors independently.

16. The logic graph displaying apparatus according to claim 1, wherein the control unit is further configured to magnify the logic graphs displayed on the logging screen.

17. The logic graph displaying apparatus according to claim 1, in which the logging screen has a plurality of grids displayed at regular intervals, and wherein the control is further configured to change the number of grids displayed on the logging screen.

18. The logic graph displaying apparatus according to claim 1, wherein the control unit is further configured to rearrange the logic graphs on the logging screen.

19. A logic graph displaying method comprising:
acquiring all on/off data generated by a molding sequence performed by a molding machine configured to operate in accordance with on/off signals, the on/off data being associated with a plurality of signal identifiers;
storing, in a memory, logging data containing on/off state and timing data representing the time each signal identifier is switched on or off; displaying a logging screen having identifier display parts and logic-graph display parts;
displaying an input window in which to input a signal identifier, when the identifier display part displaying the signal identifier on the logging screen is switched on; and
displaying a signal identifier in the identifier display part on the logging screen when the signal identifier is input in an input row provided in the input window, reading the logging data associated with the signal identifier from the memory and displaying the logic graph of the signal identifier in the logic-graph display part displayed on the logging screen.

20. A logic graph displaying apparatus for use in a molding machine that operates in accordance with on/off signals, the apparatus comprising:
a memory;
a control unit configured to acquire all on/off data generated by a molding sequence performed by the molding machine, the on/off data being associated with a plurality of signal identifiers, and to store, in the memory, logging data containing on/off state and timing data representing the time each signal identifier is switched on or off;
a logging screen having identifier display parts for displaying the signal identifiers and logic-graph display parts for displaying logic graphs of the signal identifiers; and
a computer configured to:
display an input window in which to input a signal identifier, when the identifier display part displaying the signal identifier on the logging screen is switched on;
display a signal identifier in the identifier display part on the logging screen when the signal identifier is input, in an input row provided in the input window;
read logging data associated with the signal identifier from the memory; and
display the logic graph of the signal identifier in the logic-graph display part displayed on the logging screen.

\* \* \* \* \*